United States Patent [19]
Raimondi

[11] Patent Number: 5,570,239
[45] Date of Patent: Oct. 29, 1996

[54] DIRECTIONAL SCREEN FOR A LIGHTING FIXTURE AND METHOD OF MAKING SAME

[75] Inventor: Rinaldo Raimondi, Schlieren, Switzerland

[73] Assignees: Enrico Raimondi, Thalwil, Switzerland; Olgo Raimondi-Stauble, Schlieren, Switzerland; Bruno Raimondi, Adliswil, Switzerland

[21] Appl. No.: 332,791

[22] Filed: Nov. 2, 1994

[30] Foreign Application Priority Data

Dec. 1, 1993 [CH] Switzerland .................. 3584/93

[51] Int. Cl.[6] ............... G02B 27/00; G02B 7/182; F21V 11/06; F21V 11/02
[52] U.S. Cl. ............ 359/873; 359/601; 359/894; 362/254; 362/260; 362/290
[58] Field of Search ............... 359/894, 873, 359/895, 893, 618, 454, 592, 599, 613, 601, 614; 362/290, 342, 354, 343

[56] References Cited

U.S. PATENT DOCUMENTS

| | | | |
|---|---|---|---|
| 4,820,021 | 4/1989 | Usubuchi et al. ............... | 359/601 |
| 4,877,308 | 10/1989 | Okuno et al. ............... | 359/601 |
| 5,008,791 | 4/1991 | Cafero ............... | 362/354 |
| 5,149,191 | 9/1992 | Lewin et al. ............... | 362/290 |
| 5,264,999 | 11/1993 | Kempter ............... | 362/342 |

*Primary Examiner*—Paul M. Dzierzynski
*Assistant Examiner*—Mohammad Y. Sikder
*Attorney, Agent, or Firm*—Hill, Steadman & Simpson

[57] ABSTRACT

A directional light screen and method of making the same are provided. The directional screen includes a plurality of transparent carrier members having opposing sides, the carrier members being arranged in a side-by-side manner. Thin lamellae can be placed between the carrier members, or the carrier members can be spaced by an air gap. The screen is mountable proximal to a light source. The screen directs light from the source in a direction generally parallel to the sides and lamellae. The sides can be smooth, roughened or contoured. Also, the lamellae can desirably be tinted, absorbing or reflective. Furthermore, the directional screen can be shaped to fully or partially surround a light source.

33 Claims, 5 Drawing Sheets

DIRECTIONAL SCREEN FOR A LIGHTING FIXTURE AND METHOD OF MAKING SAME

BACKGROUND OF THE INVENTION

The present invention generally relates to screens for covering a light source. More particularly, the present invention relates to a device for directing light from a source and enhancing lighting effects.

Directional screens are generally known for collimating light and other emissions. In the field of lighting, directional screens are used for collimating light from a source toward a desired direction. Additionally, some directional screens are configured to prevent or reduce glare effects. Furthermore, directional screens are used create an indirect lighting effect, for preventing glare or for aesthetic reasons.

In addition to serving the purpose of optimizing lighting effects, a directional screen can also serve the purpose of protecting the light source, particularly against moisture and dirt. The more that a directional screen surrounds the light source, the better the screen protects the light source.

A drawback of directional screens is that they reduce the light yield of from a light source. Conventional directional screens have strips or lamellae elements which are arranged in a spaced parallel assembly or in a grid. Light passes through air spaces between these lamellae elements. The lamellae elements necessarily have a thickness and, therefore, block light. This efficiency is dependent on the ratio of overall cross-sectional area of the lamellae to the total radiation-transmitting area.

On one hand, it is desirable to minimize the lamellae thickness in order to minimize the loss of light from the source. On the other hand, structural integrity is sacrificed in a grid of thin lamellae, which result in a flimsy directional screen assembly.

In an attempt to overcome such disadvantages, it is known to fill the space between lamellae with a suitable light-transmissive or radiation-transmission material. However, in directional screens of this type, undesirable mirrorings or non-diffuse reflections occur at the lamellae. A further disadvantage of such screens is that it is possible to look between the lamellae onto the light source.

Conventional techniques for manufacturing directional screen components are generally uneconomical. For example, the light-transmissive elements, are typically manufactured by cut and milled from panels of material such as acrylic glass. This is inefficient and considerably diminishes the economical benefit of such a structure. Furthermore, such a process is messy.

It is desirable to provide a directional screen for dispersing a greater amount of light from a source toward one general direction than in an opposite direction. For example, it is desirable to direct light from a ceiling light fixture generally downward to illuminate the room below.

Also, it is desirable to provide an efficient method of coloring the light emitted from a source. With known devices, coloring of light has been achieved with filters, resulting substantial light losses.

Finally, indirect lighting, i.e. illumination of an area by reflecting light from a surface such as a ceiling or wall, ha not adequately been achieved with prior art directional screens where florescent tubes are used as the light source. It has been difficult to overcome design hurdles such as low ceiling environments and the desirability to avoid casting shadows from the fittings required for fluorescent tubes.

SUMMARY OF THE INVENTION

To this end, in an embodiment, a directional light screen is provided which has a plurality of transparent carrier members arranged in a side-by-side manner generally parallel to one another, each carrier member having a refractive index such that the incident light is refracted generally perpendicularly onto an incident plane.

In an embodiment, the directional light screen includes a plurality of thin lamellae are provided. Each lamella is disposed between adjacent carrier members.

In an embodiment, adjacent carrier elements are separated by an air gap.

In an embodiment, a directional light screen is provided having a plurality of elongated transparent carrier members. Each carrier member has two oppositely facing joining sides and the carrier members are arranged in a side-by-side manner. Each carrier member defines a radiation shaft to guide light from a source in a direction generally parallel to the joining sides.

In an embodiment, the directional light screen includes a plurality of thin lamellae. A lamella is disposed against each joining side.

In an embodiment, at least some lamellae have absorbing properties for reducing reflection of light.

In an embodiment, at least some lamellae are made of a highly reflective material selected from a group including metalized paint or vapor-deposited metal the material being disposed on a smooth side.

In an embodiment, the lamellae on opposite joining sides of each carrier member have relatively different reflection properties to cast light in a desired direction.

In an embodiment, the lamellae on opposite joining sides of each carrier member have relatively different absorption properties to steer the light into a desired direction.

In an embodiment, the lamellae on opposite joining sides of each carrier member are differently colored.

In an embodiment, the lamellae are an adhesive material for joining the carrier members.

In an embodiment, the adhesive material contains an absorbent or reflective colorant.

In an embodiment, the lamellae are made of uncolored metallic foil.

In an embodiment, the sides are shaped with a repeating contour.

In an embodiment, the sides have a wave-like contour.

In an embodiment, the sides have a zig-zag contour.

In an embodiment, the sides have a sinusoidal contour.

In an embodiment, the sides have a sawtooth contour.

In an embodiment, the sides are smooth.

In an embodiment, the sides are rough.

In an embodiment, the carrier members are U-shaped.

In an embodiment, the carrier members include inwardly projecting members extending into the U-opening from upper portions of the carrier members, the members forming a collar which surrounds and protects the light source.

In an embodiment, the carrier members are annular, and accordingly the directional screen is tubular and configured for concentric mounting around a fluorescent tube, the collimation ensuing in radial direction.

In an embodiment, the carrier members are made of acrylic.

In an embodiment, the carrier members are made of glass.

In an embodiment, a method of manufacturing a directional screen is provided including the steps of: providing a plurality of carrier members having oppositely facing sides; positioning the carrier members in a side-by-side arrangement; joining the carrier members in a continuous manner; subsequently cutting the carrier members to an appropriate width and length perpendicularly relative to the plane of the lamellae.

In an embodiment, the method also includes the steps of: providing a plurality of lamellae; positioning each lamella between adjacent side-by-side carrier members.

In an embodiment, the method also includes casting the carrier members.

In an embodiment, the method further includes injection molding the carrier members.

In an embodiment, the method also includes roughening the sides of each carrier member.

In an embodiment, the roughening step is performed mechanically after the carrier member is formed.

In an embodiment, the roughening step includes applying a chemical to the sides after the carrier member is formed.

In an embodiment, the roughening step includes molding the carrier member in a mold having is roughened surfaces corresponding to the side of a carrier member molded therein.

In an embodiment, the method includes applying an adhesive between the carrier members.

In an embodiment, the method includes adding either an absorbent or reflective colorant to the adhesive.

Therefore, an advantage of the present invention is to provide a sturdy directional screen which enhances the usable light yield, while minimizing lamella thickness.

Another advantage of the present invention is to provide a directional screen having a carrier member with optical properties that enhance the light yield.

A further advantage of the present invention is to provide a method of making a directional screen in which the carrier member is treated to form a matte surface which reduces glare and results in diffuse reflection.

An additional advantage of the present invention is to provide an improved method of making a directional screen including casting or injection molding of the carrier members to result in increased efficiency and quality.

Yet another advantage of the present invention is to provide a directional screen wherein the light yield is quantitatively directed by the shaping of the lamellae or by providing a lamellae material having particular properties A still further advantage of the present invention is to provide a directional screen having an optimum admixture of light having desired color or colors with the lowest possible light losses.

Yet another advantage of the present invention is to provide a directional screen in which the view of the light source is avoided or diminished.

A further advantage of the present invention is to provide a directional screen which reflects light from a surface such as a ceiling for providing indirect, pleasant lighting of rooms.

Yet a further advantage of the present invention is to provide a directional screen in which prevents deterioration of the lamella surfaces from contaminants.

It is an additional advantage of the present invention to provide a directional screen that surrounds the light source to serve as a protective covering.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

In accordance with the invention described wherein like numerals designate like parts, the present invention provides a directional screen for directing light from a source. The present invention also includes a method of making such a directional screen. The directional screen of the present invention is structurally stable and rigid, and can efficiently pass light without undesirable and disturbing reflections.

Figure 1:
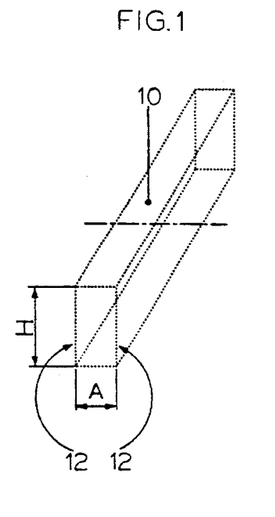
FIG. 1 is a perspective view of a carrier member according to the present invention having a smooth surface at both sides.
Figure 11:
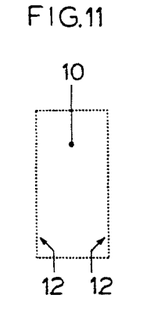
FIG. 11 is a sectional view taken generally along line XI—XI of FIG. 1.

In the embodiment illustrated in FIGS. 1 and 11, a carrier member 10 is provided which has two oppositely facing joining sides 12. Each carrier member 10 acts as a light shaft which can pass light therethrough. Each carrier member 10 can be made of acrylic glass, transparent plastics, or other types of glass, preferably having low radiation losses. In the embodiment illustrated, the sides 12 are smooth.

Figure 2:
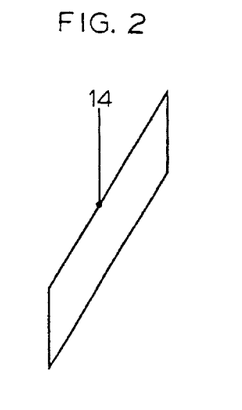
FIG. 2 is a perspective view of a lamella according to the present invention.
Figure 3:
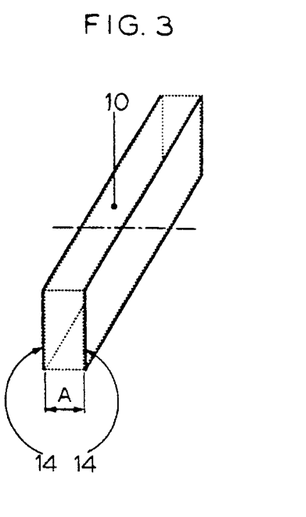
FIG. 3 is a perspective view of a carrier member according to the present invention having smooth surfaces and with a respective lamella applied on both sides.
Figure 12:
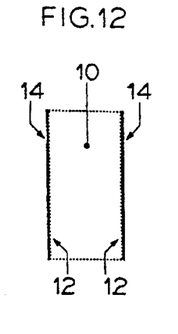
FIG. 12 is a sectional view taken generally along line XII—XII of FIG. 3.

In an embodiment, a lamella 14 is provided, as shown in FIG. 2. FIGS. 3 and 12 show the carrier member 10 with the lamella 14 applied to each of the opposing two sides 12. Referring to FIGS. 1 and 3, the dimension A represents the width of the carrier member 10, which is also the spacing distance between the lamellae 14 associated with each carrier member 10.

Figure 4:
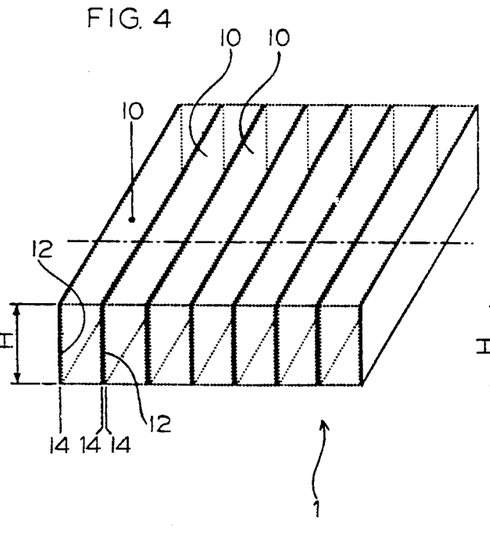
FIG. 4 is a perspective view of a directional screen according to the present invention formed from a plurality of joined elements of the type in FIG. 3.
Figure 13:
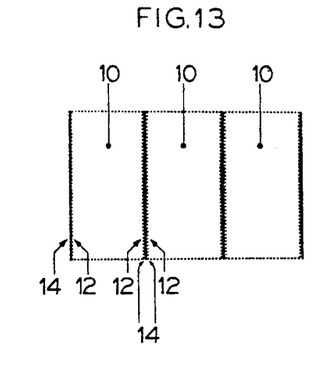
FIG. 13 is a partial sectional view taken generally along line XIII—XIII of FIG. 4.
Figure 22:
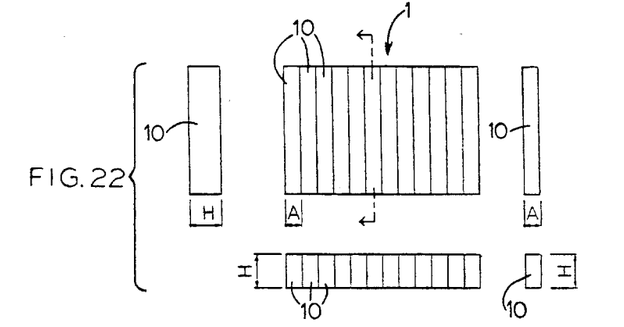
FIG. 22 illustrates multiple views of a directional screen according to the present invention having parallel planar carrier members, including a top plan view, a front elevational view and a side sectional view.

A plurality of carrier members 10 with lamellae 14 applied thereto are assembled together to form a directional screen 1, as illustrated in FIGS. 4, 13 and 22. In FIGS. 3 and 4, H represents the height of the carrier member 10, which equals the thickness of the directional screen 1. The carrier members 10 are positioned against one another so that joining surfaces of sides 12 of adjacent carrier members 10 face one another with the associated lamellae 14 in contact therebetween.

The directional screen 1 of the present invention exhibits great structural stability because the transparent carrier members 10 are strong and rigid. Furthermore, the lamellae 14 are preferably thin, having a minimal thickness to provide the highest possible light yield.

The directional screen 1 is mountable so that the carrier member sides 12 and lamellae 14 are oriented generally perpendicularly to a light source (not shown). This results in an effect of channeling light away from the source. Furthermore, this channeling effect reduces a direct view onto the source from the perspective of an occupant of a room in which the directional screen is used. In other words, one can only directly view source through the directional screen if looking in a direction substantially parallel to the sides 12.

In other words, the sides 12 and lamellae 14 direct light radiation through the carrier members 10 in a general direction away from the light source, while blocking a direct view of the source from a lateral perspective. The greater the thickness dimension H relative to the width dimension A, the narrower the channeling effect of the light through each carrier member 10. Thus, a viewer would have be viewing at an angle generally perpendicular to the screen 1 in order to directly see the source light.

Light is refracted toward the surface opposite the perpendicular upon incidence onto a surface of the carrier member 10 and, thus, more light rays pass through the space between the lamellae 14 of the directional screen 1 without being incident thereon. The light yield is thereby increased.

Figure 5:
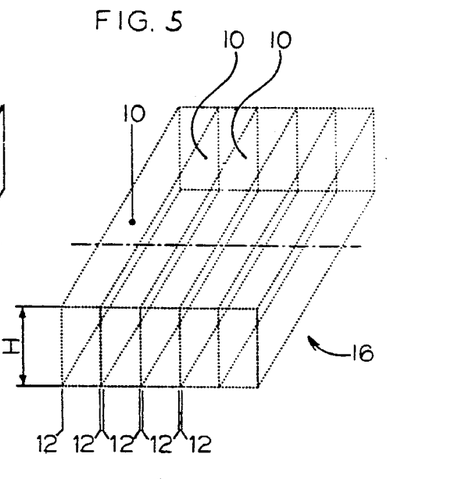
FIG. 5 is a perspective view of a directional screen according to the present invention formed from a plurality of carrier members with smoothly polished surfaces joined without lamellae.
Figure 14:
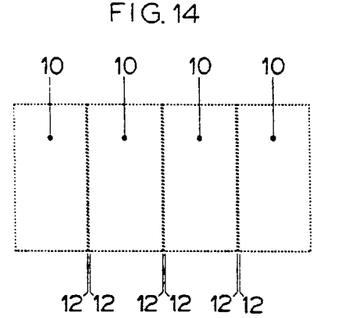
FIG. 14 is a partial sectional view taken generally along line XIV—XIV of FIG. 5.

In an embodiment, the carrier members 10 can be assembled together without lamellae 14 therebetween to form a directional screen 16, as illustrated in FIGS. 5 and 14. In an embodiment, a narrow air gap can be formed between neighboring carrier members 10.

Figure 6:
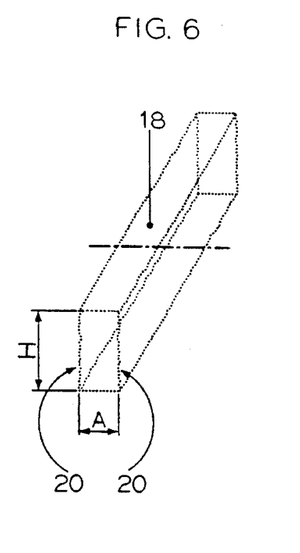
FIG. 6 is a perspective view of a carrier member according to the present invention with a rough surface at both sides.
Figure 7:
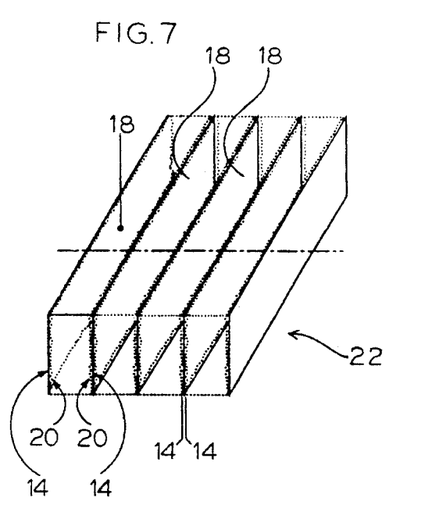
FIG. 7 is a perspective view of a directional screen according to the present invention formed from a plurality of carrier members having a rough surfaces and lamellae.
Figure 15:
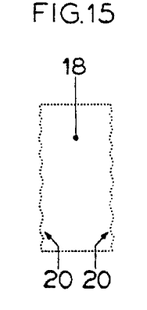
FIG. 15 is a sectional view taken generally along line XV—XV of FIG. 6.
Figure 16:
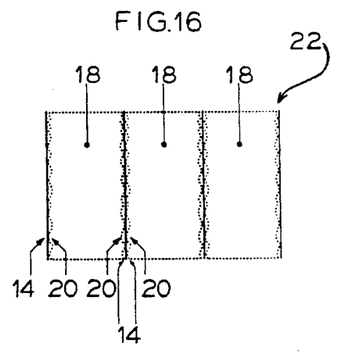
FIG. 16 is a partial sectional view taken generally along line XVI—XVI of FIG. 7.

In an embodiment, carrier members 18 are provided having rough or matte joining sides 20, as shown in FIGS. 6 and 15. Lamellae 14 can be disposed on the rough sides 20. A plurality of the carrier members 18 having rough joining sides 20 are also assembled in a side-to-side manner with the lamellae 14 therebetween, forming a directional screen 22, as illustrated in FIGS. 7 and 16. A highly diffusing effect is thereby achieved, eliminating mirroring effects.

The carrier member 18 can be roughened by application of a chemical or by a mechanically treatment such as sandblasting. The carrier members 18 can also be made by casting injection in a correspondingly roughened mold. However formed, the rough matte sides 20 have a random structure.

Figure 8:
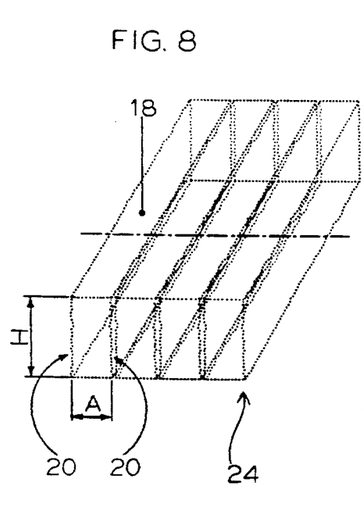
FIG. 8 is a perspective view of a directional screen according to the present invention formed from a plurality of carrier members having a rough surfaces joined without lamellae.
Figure 17:
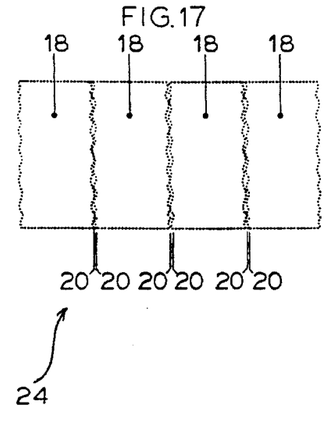
FIG. 17 is a partial sectional view taken generally along line XVI—XVII of FIG. 8.

In an embodiment, as illustrated in FIGS. 8 and 17, a plurality of carrier members 18 having a rough sides 20 can be joined without lamellae 14 to form a directional screen 24. The carrier members 18 can be assembled in contact with each other or with a narrow air gap therebetween.

Figure 9:
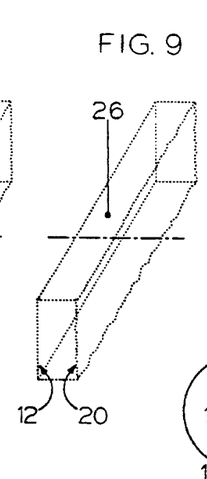
FIG. 9 is a perspective view of a carrier member according to the present invention having a rough surface on one side and a smooth surface on the other side.
Figure 10:
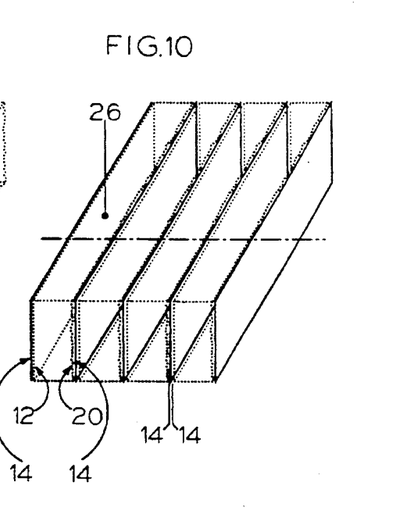
FIG. 10 is a perspective view of a directional screen formed from a plurality of carrier members of the type in FIG. 9.
Figure 18:
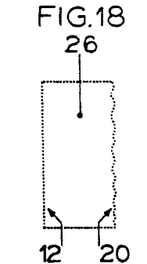
FIG. 18 is a sectional view taken generally along line XVIII—XVIII of FIG. 9.
Figure 19:
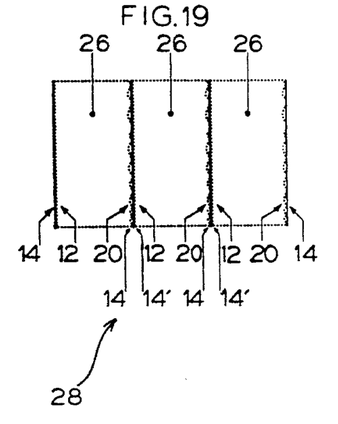
FIG. 19 is a partial sectional view taken generally along line XIX—XIX of FIG. 10.

Desirable results can be obtained by providing a carrier member 26 having one rough side 20 and one smooth side 12, as shown in FIGS. 9 and 18. A directional screen 28 formed of a plurality of such carrier members 26 is illustrated in FIGS. 10 and 19. The carrier members 26 are commonly oriented so that the rough side 20 of the carrier member 26 faces the smooth side 12 of an adjacent carrier member 26. In this embodiment, a lamella 14 applied to the rough side 20 preferably has absorbent properties, and a lamella 14' applied to the smooth side 12 comprises reflective properties. These combined features result in a casting of the light in a desired direction.

Figure 20:
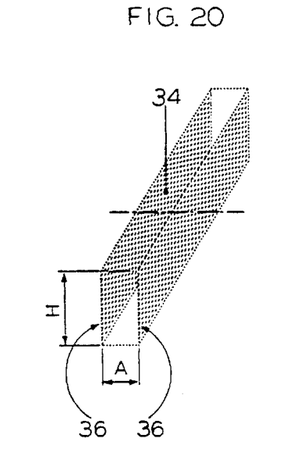
FIG. 20 is a perspective view of a carrier member according to the present invention having side surfaces with a regular contour pattern.

Instead of carrier members having random or rough sides 20, contoured carrier members 34 can be provided having regular or planned shapes for affecting reflectance conditions. As illustrated in FIG. 20, where uniformly dashed areas indicated a repeating pattern. For instance, the present invention includes embodiments with carrier members 34 having a lengthwise-running contour. These carrier member has sides 36 have a regular contour which repeats along the height H wherein the contour is generally formed by lengthwise grooves.

Figure 21A:
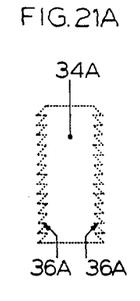
FIG. 21A is a sectional view of an embodiment of a carrier member according to the present invention having side surfaces with a regular sawtooth contour pattern.
Figure 21B:
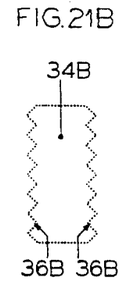
FIG. 21B is a sectional view of an embodiment of a carrier member according to the present invention having side surfaces with a regular zig-zag contour pattern.
Figure 21C:
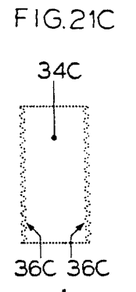
FIG. 21C is a sectional view of an embodiment of a carrier member having side surfaces with a regular sinusoidal contour pattern according to the present invention.
Figure 21D:
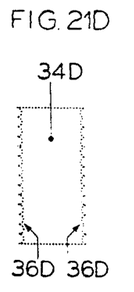
FIG. 21D is a sectional view of an embodiment of a carrier member having side surfaces with a regular wave contour pattern according to the present invention.

FIGS. 21A–3D illustrate examples of various contouring shapes: FIG. 21A shows a carrier member 34A with a side 36A having a repeating sawtooth-like shape; FIG. 21B shows a carrier member 34B with a side 36B having a zig-zag shape; FIG. 21C shows a carrier member 34C with a side 36C having a sinusoidal shape; and FIG. 21D shows a carrier member 34D with a side 36D having a wave-like shape.

Figure 23:
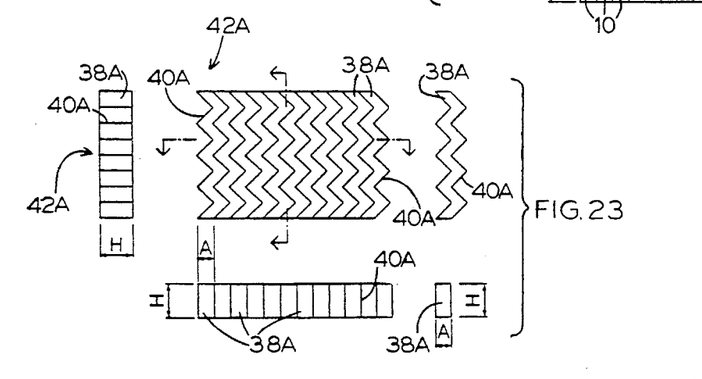
FIG. 23 illustrates multiple views of a directional screen according to the present invention having parallel zig-zag or angled carrier members, including a top plan view, a front elevational view and a side sectional view.
Figure 24:
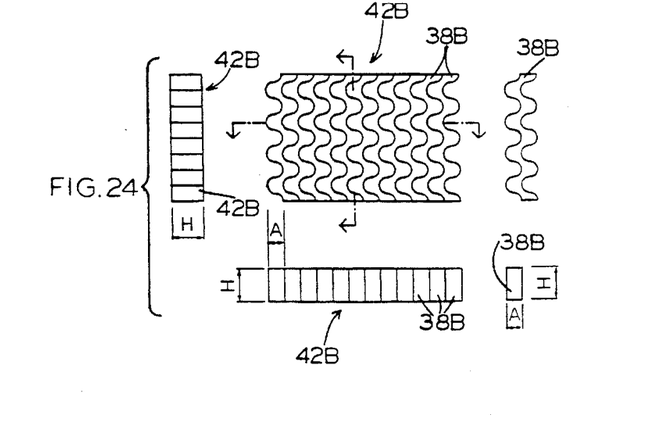
FIG. 24 illustrates multiple views of a directional screen according to the present invention having parallel wave-like carrier members, including a top plan view, a front elevational view and a side sectional view.

An undesirable direct view to the light source can be substantially reduced in embodiments of the present invention as illustrated in FIGS. 23 and 24. In the embodiment of FIG. 23, carrier members 38A have zig-zag shaped sides 40A with a heightwise-running contour along each side 40A so that adjacent sides 40A of multiple carrier members 38 are complimentarily received by one another, forming a directional screen 42A. In the embodiment of FIG. 24, carrier members 38B have corrugated or sinusoidal shaped sides 40B with a heightwise-running contour along each side 40B so that adjacent sides 40B of multiple carrier members 38B are complimentarily received by one another, forming a directional screen 42B.

Figure 25:
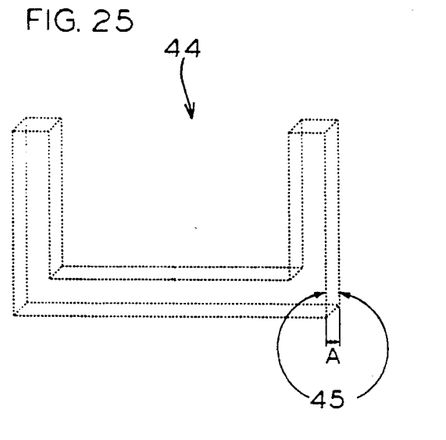
FIG. 25 is a perspective view of a generally U-shaped carrier member according to the present invention.
Figure 26:
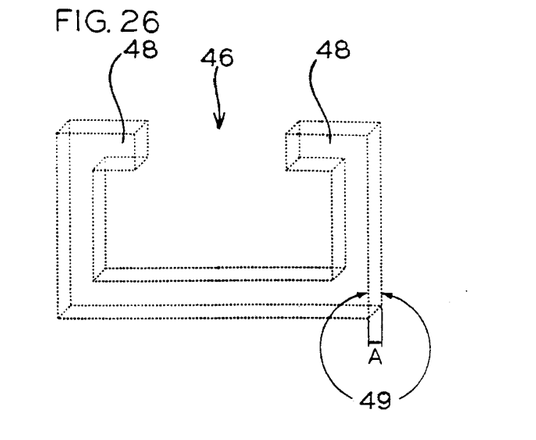
FIG. 26 is a perspective view of a generally U-shaped carrier member according to the present invention having upper inward projections.

The directional screen of the present invention can be configured to partially or fully enclose the light source. For instance, FIG. 25 shows a U-shaped carrier member 44 that is suitable for surrounding a wide source. FIG. 26 shows a U-shaped carrier member 46 having projections 48 extending inwardly. This embodiment can be provided to more completely surround a particular light source.

Figure 27:
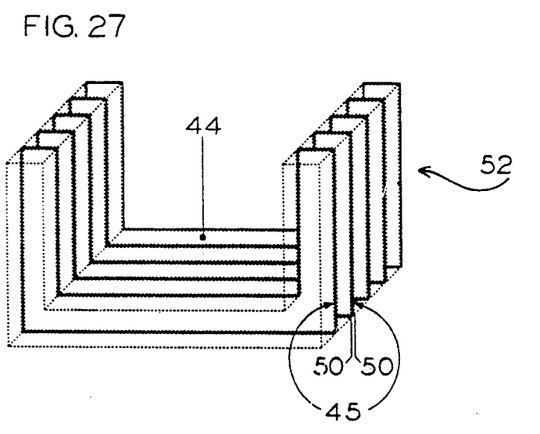
FIG. 27 is a perspective view of an assembly of generally U-shaped carrier members with lamellae to form a directional screen according to the present invention.

Similar to the aforementioned embodiments, a plurality of U-shaped carrier members 44 or 46 can be assembled together. FIG. 27 shows such an assembly of U-shaped carrier members 44 according to FIG. 25 with corresponding lamellae 50 therebetween, forming a directional screen 52.

The embodiments of FIGS. 25–27 result in a casting of source light laterally onto the ceiling of a room for illuminating a room by diffuse, indirect light. Furthermore, such directional screen covers and protects the light source. Sides 45 and 49 of carrier members 44 and 46, respectively, are shown as being smooth, but could also be rough or matte.

Figure 28:
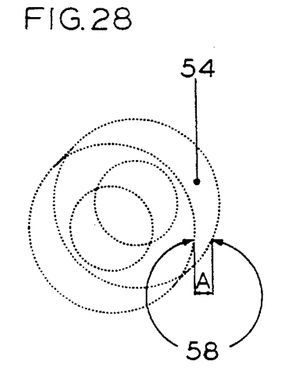
FIG. 28 is a perspective view of an annular carrier member according to the present invention.
Figure 29:
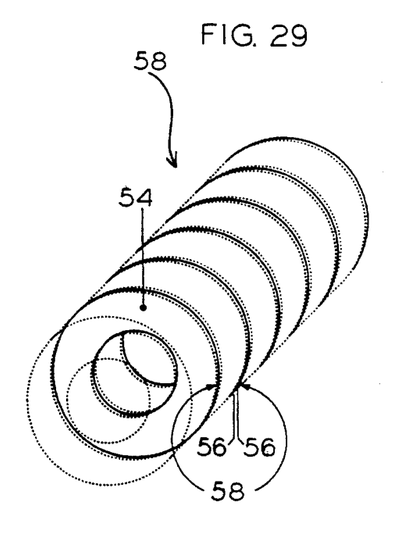
FIG. 29 is a perspective view of an assembly of carrier members as shown in FIG. 28 to form a cylindrical directional screen according to the present invention.

In the embodiment illustrated in FIG. 28, a carrier member 54 can be shaped annularly. A plurality of such annular carrier members 54 can be arranged side-to-side with lamellae 56 therebetween to form a cylindrical directional screen 58, as shown in FIG. 29. This embodiment is configured to concentrically surround a fluorescent tube, resulting in a highly diffusing effect. Sides 58 of the carrier member 54 are illustrated as being smooth, but can be rough or matte also.

By shaping a directional screen to enclose a light source to some degree, light can be pleasantly diffused and cast against adjacent room surfaces such as a ceiling or wall. The U-shaped directional screen 52 (FIG. 27) or the tubular directional screen 58 (FIG. 29) are particularly suitable for indirect lighting. Furthermore, the directional screens 52 and 58 provide optimum protection against environmental influences.

The lamellae 14, 30, 32, 50, 56 can be inventively applied by various methods including: application with brushes or rollers; spraying; vapor-deposition; or by photographic or printing techniques. The lamellae 14, 30, 32, 50, 56 can be made of paint, metal, plastic, or suitable types of glue. Half of a lamella can be applied to a side of a carrier member prior to the assembly and joining of multiple carrier members into a directional screen. Lamella halves are thereby positioned together back-to-back to form a lamella element between carrier members. The lamella halves can be differently colored for generating a desired color mix in the light passing through the screen.

The diffuse effect of a contoured or roughened side is further enhanced by using tinted lamellae or lamellae that absorb a desired wavelength of light. A particular diffuse reflection can thereby be reduced to a minimum. However, for certain applications the mirroring of light from lamellae is desirable. Thus, such a mirroring effect can be increased by making lamellae from highly reflective materials with a carrier member having optimally smooth sides. Suitable materials can be metalized paints, vapor-deposited metals, or foils and the like.

Since each lamella has two sides, and each side can be applied on a neighboring carrier member, a different light yield in a particular direction can be achieved by an embodiment of the invention having mirrored or diffusely reflective lamella applied to carrier member sides facing one common direction and absorbent lamella applied to the oppositely facing carrier member sides. With such a configuration, radiation is cast in a specific direction.

The individual carrier members 10, 18, 26 34, 44, 46, 54 can be manufactured by casting or injection molding. This results in increased efficiency and higher quality production.

An embodiment of the present invention provides a method of making a directional screen in which the carrier member surface is treated to form a matte surface or rough side which avoids glare and promotes the diffuse reflection.

The light yield can be quantitatively directed from the source by the shaping of the lamellae. Source light can also be directed as the result of the selection of the material for the lamellae.

The present invention also provides a directional screen which colors the source light passing therethrough without sacrificing the light yield. Accordingly, some or all of the lamellae can be colored. This results in an optimum admixture of light having desired color or colors with the lowest possible light losses.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A directional light screen comprising:
   a plurality of transparent carrier members secured together in a side-by-side manner generally parallel to one another forming an integral screen body having a source-facing side and an opposite side, each carrier member extending a thickness of said integral screen body from said source-facing side to side opposite side, each carrier member having a refractive index such that incident light is refracted generally perpendicularly onto an incident plane; and a plurality of film-like lamellae, each lamella being disposed between adjacent carrier members.

2. A directional light screen for guiding a light from a source, the light screen comprising:

a plurality of elongated transparent carrier members, each carrier member having two oppositely facing joining sides; and, a plurality of film-like lamellae, a lamella being disposed against each said joining side;

wherein said carrier members are secured together in a side-by-side manner forming an integral screen body such that joining sides of adjacent carrier members lie against one another with at least one lamella disposed therebetween, each carrier member extending a thickness of said screen and defining a radiation shaft between respective said joining side to guide light through said thickness from a source in a direction generally parallel to said joining sides.

3. The directional light screen according to claim 2, wherein at least some lamellae have absorbing properties for reducing reflection of light.

4. The directional light screen according to claim 2, wherein at least some lamellae are made of a highly reflective material selected from a group consisting of metalized paint and vapor-deposited metal, the material being disposed on a smooth side.

5. The directional light screen according to claim 2, wherein the lamellae on opposite joining sides of each carrier member have relatively different reflection properties to cast the light into a desired direction.

6. The directional light screen according to claim 2, wherein the lamellae on opposite joining sides of each carrier member have relatively different absorption properties to cast the light into a desired direction.

7. The directional light screen according to claim 2, wherein the lamellae on opposite joining sides of each carrier member are differently colored.

8. The directional light screen according to claim 2, wherein the lamellae are an adhesive material for joining the carrier members.

9. The directional light screen according to claim 8, wherein the adhesive material contains a light absorbent.

10. The directional light screen according to claim 2, wherein the lamellae are made of uncolored metallic foil.

11. The directional light screen according to claim 2 wherein the joining sides are shaped with a repeating contour.

12. The directional light screen according to claim 11, wherein the joining sides have a wave-like contour.

13. The directional light screen according to claim 11, wherein the joining sides have a zig-zag contour.

14. The directional light screen according to claim 11, wherein the joining sides have a sinusoidal contour.

15. The directional light screen according to claim 11, wherein the joining sides have a sawtooth contour.

16. The directional light screen according to claim 2, wherein the joining sides are smooth.

17. The directional light screen according to claim 2, wherein the joining sides are rough.

18. The directional light screen according to claim 2, wherein the carrier members are U-shaped.

19. The directional light screen according to claim 18, wherein the carrier members include projecting inwardly members extending into the U-opening from upper portions of the carrier members, the members forming a collar which surrounds and protects the light source.

20. The directional light screen according to claim 2, wherein the carrier members are annular, and accordingly the directional screen is tubular and concentrically mountable around a fluorescent tube, the collimation ensuing in radial direction as a result thereof.

21. The directional light screen according to claim 2, wherein the carrier members are made of acrylic.

22. The directional light screen according to claim 2, wherein the carrier members are made of glass.

23. A method of manufacturing a directional screen comprising the steps of:

providing a plurality of carrier members, each carrier member having a pair of parallel and oppositely facing sides;

providing a plurality of film-like lamellae;

positioning the carrier members in a side-by-side arrangement such that joining sides of adjacent carrier members lie against each other such that at least one said lamella is disposed therebetween, the lamellae being shaped to cover said joining sides;

joining the carrier members and lamellae in a continuous manner, forming an integral light screen body; and subsequently cutting the light screen body to an appropriate with and length perpendicularly relative to the sides.

24. The method according to claim 23, further comprising the step of:

casting the carrier members.

25. The method according to claim 23, further comprising the step of:

injection molding the carrier members.

26. The method according to claim 23, further comprising the step of:

roughening the sides of each carrier member.

27. The method according to claim 26 wherein the roughening step is performed mechanically after the carrier member is formed.

28. The method according to claim 26, wherein the roughening step includes applying a chemical to the sides after the carrier member is formed.

29. The method according to claim 26, wherein the roughening step includes molding the carrier member in a mold having roughened surfaces corresponding to the side of a carrier member molded therein.

30. The method according to claim 23 wherein the joining step includes:

applying an adhesive between the carrier members, the adhesive forming the film-like lamellae.

31. The method according to claim 30, further comprising the step of:

adding a light to the adhesive.

32. The directional light screen according to claim 8 wherein the adhesive material contains a light reflective colorant.

33. The method according to claim 23, further comprising the step of:

adding a light reflective colorant to the adhesive.

* * * * *